May 19, 1953 W. W. WARD 2,639,156

DOUBLE-TWIST PHONOGRAPH STYLUS ASSEMBLY

Filed Oct. 29, 1949

Inventor:
William W. Ward,
by Merton D. Moore
His Attorney.

Patented May 19, 1953 2,639,156

UNITED STATES PATENT OFFICE 2,639,156

DOUBLE-TWIST PHONOGRAPH STYLUS ASSEMBLY

William W. Ward, Liverpool, N. Y., assignor to General Electric Company, a corporation of New York Application October 29, 1949, Serial No. 124,266

12 Claims. (Cl. 274—38)

Figure 1:
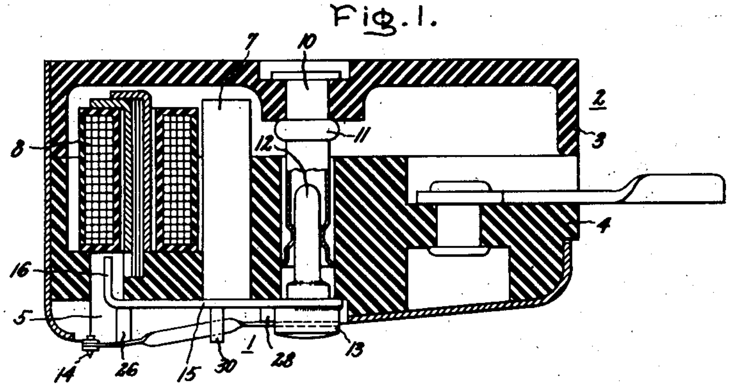

My invention relates to phonograph pickup apparatus, and, more particularly, to phonograph pickup apparatus which employs an elongated cantilever type of stylus support. It is a primary object of my invention to provide an improved phonograph stylus support of the cantilever type.

In many instances, phonograph pickups employ an elongated stylus supporting member of substantial length, which may be termed a cantilever support, and which is particularly adapted to provide substantial compliance for the stylus so as to enable the stylus to follow the lateral undulations of the sound groove. However, when such a "soft" type of stylus support is employed, other considerations arise. One of the most important of such considerations is the effect in such a structure of what is termed "needle talk" or direct acoustic radiation from the record through the phonograph pickup. In the usual situation, the motor board on which the phonograph pickup tone arm is mounted acts as a sounding board so that mechanical vibrations are transmitted from the record through the pickup with a resultant sound reproduction which appears to come from within the phonograph and which conflicts with the reproduction of the recorded sounds through the conventional electrical apparatus.

Also, with the advent of phonograph records having different groove sizes, it is highly desirable to provide a phonograph stylus support in which the tracking pressure necessary to maintain the stylus in engagement with the record groove is reduced to a minimum so that a stylus assembly may be utilized to play any type of lateral cut phonograph record without changing the tracking pressure.

Accordingly, it is an object of my invention to provide a new and improved phonograph stylus support wherein needle talk, or direct acoustic radiation from the record, is substantially reduced.

It is a further object of my invention to provide a new and improved phonograph stylus support wherein the tracking pressure necessary to maintain the stylus in engagement with a sound groove is substantially reduced.

It is another object of my invention to provide a new and improved stylus support in which the frequency response characteristic of the support may be modified over a relatively wide range of values.

Briefly, in accordance with one phase of my invention, I provide a stylus support for a phonograph pickup in the form of a relatively wide, resilient ribbon having its principal axis extending substantially horizontally and having one end thereof rigidly supported in the pickup. The ribbon is provided with a pair of spaced quarter twists so as to define end portions having the wide face thereof disposed in a horizontal plane and an intermediate section having the wide face thereof disposed in a vertical plane. A stylus is positioned for record engagement on the free end of the ribbon and damping means are provided at both the horizontally positioned end portions so as substantially to reduce direct acoustic radiation from the record. In a preferred embodiment, an additional damping means is positioned on the vertically disposed intermediate section so as to produce a desired high frequency response characteristic of the stylus support.

Figure 2:
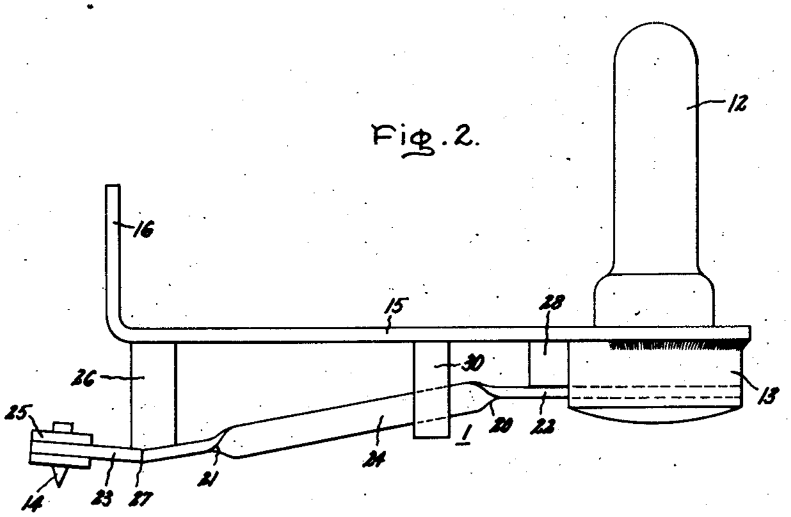
Figure 3:
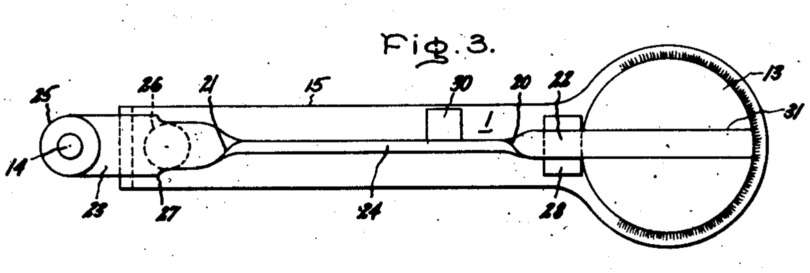

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a sectional side elevational view of a phonograph pickup, wherein my improved phonograph stylus support is employed; Fig. 2 is a side elevational view of the stylus assembly of Fig. 1 showing my stylus support in greater detail; and Fig. 3 is a bottom view of the stylus assembly of Fig. 2.

Referring now to Fig. 1 of the drawing, there is therein illustrated a phonograph stylus support which is constructed in accordance with the principles of my invention and is indicated generally at 1. The stylus support 1 is shown in operative position within a phonograph pickup apparatus which is indicated generally at 2. The phonograph pickup 2, which may be of any well-known type, is shown as a variable reluctance type pickup which employs a removable stylus assembly. This removable stylus type pickup is disclosed and claimed in Patent 2,554,208 issued May 22, 1951, to Eric O. Peterson and Carroll R. Miner, which was filed on April 2, 1948, and which is assigned to the same assignee as the present invention.

The phonograph pickup 2 comprises a pair of interfitting molded parts 3, 4 which enclose the electric current producing portions of the pickup. Parts 3, 4 are held in assembled relation by means of a stylus assembly. The electric current producing portion of the pickup comprises a pair of pole pieces 5 which are arranged on opposite sides of the cantilever stylus support 1 at the free end thereof so that as the stylus is moved laterally in engagement with the phonograph record to be reproduced, the flux in an associated magnetic path is varied in accordance with the lateral variations of the stylus. Magnetic flux between pole pieces 5 is provided by a permanent magnet 7. A pair of coils 8 associated with the magnetic structure are utilized to produce electric currents, the frequency components of which vary in accordance with the lateral variations of the free end of the stylus support 1.

A removable stylus assembly is provided, this assembly comprising a tubular eyelet 10 which is attached to the member 3 by passing the eyelet through an aperture in cover 3 and flaring over the upward end 11 of the eyelet. The lower portion of the eyelet 10 is adapted to receive and firmly hold the post 12 of the removable stylus assembly. The lower portion of the post 12 is provided with an enlarged head 13 which engages the lower surface of base member 4. The enlarged head portion 13 is provided with a vertically disposed slot at the lower surface thereof so as to receive the captive end portion of the stylus support 1, and the other end of support 1 is provided with a record engaging stylus 14.

To assure that the free end of the cantilever stylus support 1 is positioned substantially midway between pole pieces 5, there is provided a guide 15 which is spaced from and arranged parallel to the support 1. At one end, guide 15 is secured to post 12. At the other end, the guide 15 has a vertically extending portion 16 which extends between pole pieces 5 and is of a width substantially equal to the distance between the pole pieces.

In considering the operation of the phonograph pickup as a unit, reference may be had to the above-mentioned application for a detailed description of the operation thereof. However, for the purposes of the present invention, it may be stated that the free end portion of support 1 is centered in the air gap between pole pieces 5 and when the stylus 14 is vibrated by engagement with the groove of a sound record, the vibrations of the stylus produce corresponding changes in the flux passing through the coils 8. Due to the fact that stylus support 1 is of substantial length, the free end portion thereof possesses sufficient vertical and lateral compliance so as to follow faithfully the lateral movements of the sound track and also the vertical movements due to the pinch effect thereof.

Referring now more particularly to the phonograph stylus support 1, there is shown in Fig. 2 in greater detail the support 1 in operative position in the removable stylus assembly of Fig. 1. The stylus support 1 is in the form of a ribbon of substantial width as compared to the thickness thereof and may be of resilient magnetic material, such as, for example, tool steel or the like. While the support 1 may have various ratios of width to thickness depending on the desired compliance, I prefer to employ a ribbon of approximately .010 inch in thickness and .030 inch in width. Such a three-to-one ratio of width to thickness has been found satisfactory for standard groove records with a tracking pressure of one-half an ounce. For long playing records, I prefer to employ a ribbon .008 inch thick and .030 inch wide, which ratio has been found satisfactory for long playing records with a tracking pressure of 6 to 8 grams. The support is provided with a pair of spaced sharp twists 20, 21 which define a first end portion 22, the broad face thereof being positioned in a substantially horizontal plane and being rigidly secured in a corresponding groove in the base member 13. Twist 21 provides a second end portion 23, the broad face thereof being arranged in a substantially horizontal plane. An intermediate section 24 is thus provided with the broad face thereof extending in a substantially vertical plane. The stylus 14 is secured to end portion 23 by means of a suitable boss or collar 25 within which the stylus is positioned.

Due to the fact that the stylus assembly may be tilted forward by a slight amount when the pickup engages the bottom one of a group of records, the support 1 is bent slightly upward at 27. The end portion 23 is thus disposed at a few degrees to the horizontal in some playing positions. However, it will be appreciated that vertical compliance is maintained despite slight variations from the horizontal of the end portion 23.

To eliminate undesired modes of vibration of the elongated stylus support 1, there is provided a first damping means 26 which may comprise a cylinder of butyl rubber, or the like. The damping material 26 is positioned between the undersurface of guide member 15 and the top surface of end portion 23 adjacent the bend 27 therein, so as substantially to prevent vibration of the entire support at the natural resonances thereof. The damping material is necessarily of substantial height so as to give the desired lateral compliance, hence the slight downward slope of section 24.

It will be evident from a consideration of the structure thus described that the damping means 26, which is positioned behind the stylus 14, tends to act as a fulcrum, about which the support may pivot. If the cantilever is rigidly supported at the captive end thereof with the broad face of the ribbon in a vertical plane, a characteristic of many prior art arrangements, then vertical movements of the stylus 14, which may be produced by the pinch effect of the record grooves or the like, are transmitted through the support, the post member 12 and the tone arm itself to the motor board wherein acoustic radiation takes place. However, with the construction of my improved type of stylus support, a high degree of vertical compliance is provided adjacent the supported end of the cantilever so that needle talk, that is, direct acoustic radiation from the record, is substantially prevented even though the above-mentioned fulcruming action of the damping means positioned adjacent the stylus may be present. Such increased vertical compliance is achieved by providing the support with a horizontally extending end portion 22 which is adjacent the rigidly supported end thereof. By such an arrangement, vertical movements of the intermediate portion 24, which is disposed in a vertical plane, are absorbed in the section 22 which has a high degree of compliance for vertical movements so that these vertical vibrations do not reach the rigid phonograph support 13.

In order to aid the above-mentioned vertical damping action, I additionally provide a block of damping material 28, which is positioned between the undersurface of guide 15 and the upper surface of end portion 22 adjacent the base 13. The damping material 28 operated additionally to absorb any vertical movements which may be exerted on the captive end of the support and in effect provides a more compliant end section 22.

In accordance with the operation of the stylus support described above, the stylus support 1 has a frequency response characteristic for lateral vibrations of the stylus which is dependent upon the amount of damping material 26 which is used, and upon the length of the intermediate section 24 of the support due to the fact that the portion 24 produces the necessary lateral compliance for proper tracking of the sound groove. In particular, the high frequency components of the recorded vibrations may be suppressed due to the fact that the damping material 26 restrains the free end of the support and a secondary resonance condition may be reached in which the free end of the support tends to stand still and the intermediate section to whip back and forth. In such a resonance condition, the output of the pickup, which is proportional to lateral displacement of the free end of the support, is greatly reduced.

However, in accordance with my invention, I provide separate damping means 30, which may comprise a block of any suitable damping material, which is positioned between the guide 15 and section 24 adjacent the twist 20. The block of damping material 30 is illustrated in Fig. 2 as extending alongside the section 24 and is secured thereto by any convenient means such as cementing, or the like. The length of block 30 is made sufficiently great to enable the block to be cemented to various portions of the downwardly extending section 24. By such an arrangement, the damping material 30 restrains the intermediate section 24 so that during the above-mentioned resonance conditions the free end of the support is forced to vibrate, thus increasing the high frequency output of the pickup.

The spacing of the damping material 30 from the twist 20 determines the effective length of the intermediate section 24 at high frequencies and thus provides a relatively simple means for obtaining a desired high frequency response characteristic of the support. However, the damping material 30 is preferably positioned relatively close to the twist 20, otherwise the damping material 30 reduces the effective length of the section 24 to a point where proper tracking is no longer obtainable.

In Fig. 3, there is illustrated a bottom view of the stylus support assembly of Fig. 2. This figure illustrates more clearly the relative positioning of the damping material 30 and the intermediate section 24 of the stylus support 1. This figure also illustrates the way in which the end portion 22 of the support is secured to the base 13, the end portion 22 fitting within a groove 31 in the base member 13 and being secured therein by means of solder or the like.

While I have indicated my stylus support as being utilized in a removable stylus unit type of phonograph pickup, it is evident that the cantilever type support arm may be employed in many other types of phonograph pickups.

From the foregoing, it is evident that the present invention provides a phonograph stylus support which is particularly adapted to provide a high degree of vertical compliance so as substantially to reduce direct acoustic radiation from the record. In addition, separate damping means operate in conjunction with the vertically extending intermediate portion of the support to provide a predetermined high frequency response characteristic of the support.

While the invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States is:

1. A stylus support assembly for a phonograph pickup head, comprising in combination, a relatively wide, thin, resilient ribbon having its principal axis extending generally horizontally and having a pair of spaced quarter twists therein to provide end portions each having the wide face thereof disposed generally in a horizontal plane through said axis and an intermediate section having the wide face thereof disposed generally in a vertical plane through said axis, a record-engaging stylus, means for securing said stylus to one of said end portions so as to extend substantially perpendicularly therefrom, a supporting means adapted for rigidly mounting said other end portion on said pickup head, first damping means positioned on said one end portion intermediate said stylus and said vertically disposed section and second damping means positioned on said other end portion adjacent said supporting means.

2. A stylus support assembly for a phonograph pickup head, comprising in combination, a relatively wide, thin, resilient, cantilever ribbon having its principal axis extending generally horizontally and having a pair of spaced quarter twists therein to provide end portions each having the wide face thereof disposed generally in a horizontal plane through said axis and an intermediate section having the wide face thereof disposed generally in a vertical plane through said axis, a record-engaging stylus, means for securing said stylus to one of said end portions, a supporting means arranged for rigidly mounting said other end portion on said pickup head, a cantilever arm positioned substantially parallel to said ribbon, said arm having one end rigidly attached to said supporting means, first damping means positioned between said one end portion and said arm, and second damping means positioned between said other end portion and said arm, thereby substantially to reduce transmission of vertical vibrations of said stylus through said ribbon to said supporting means and said head.

3. A stylus support assembly for a phonograph pickup comprising, in combination, a mounting member, a relatively broad, thin, resilient ribbon having its principal axis extending horizontally and having a pair of spaced quarter twists therein to provide horizontally disposed end portions and a vertically disposed intermediate section, means for rigidly securing one of said end portions to said mounting member, a record-engaging stylus positioned on said other end portion, first damping means positioned on said one end portion adjacent said mounting member, and second damping means positioned on said other end portion.

4. A stylus support assembly for a phonograph pickup comprising, in combination, a mounting member, a relatively broad, thin, resilient ribbon having its principal axis extending horizontally and having a pair of spaced quarter twists therein to provide horizontally disposed end portions and a vertically disposed intermediate section, means for rigidly securing one of said end portions, to said mounting member, a record-engaging stylus positioned on said other end portion, first damping means positioned on said one end portion adjacent said mounting member, second damping means positioned on said other end portion, and third damping means positioned on said vertically disposed intermediate section adjacent said one end portion, thereby to provide a predetermined high frequency response characteristic of said stylus support.

5. A stylus support assembly for a phonograph pickup head, comprising a relatively thin flat ribbon extending generally along a principal axis and having a pair of spaced quarter-twists therein arranged to provide two end portions each having a wider face thereof disposed substantially in a first plane through said axis and an intermediate section having the wider face thereof disposed in a second, substantially perpendicular plane through said axis, a record-engaging stylus, means securing said stylus to one of the said end portions, said stylus extending in the plane of said intermediate section, means adapted for rigidly mounting said other end portion on said pickup head, first vibration-damping means positioned on said one end portion adjacent said stylus, and second vibration-damping means positioned on said other end portion adjacent said mounting means.

6. A removable stylus subassembly for a phonograph pickup head comprising a mounting member adapted to be attached to said head, a first cantilever arm having one end rigidly attached to said member, said arm comprising a flat metal strip having two spaced quarter-twists along its length arranged to provide an intermediate flat portion of said strip lying in a plane substantially normal to the plane of its end portions, a stylus, means securing said stylus to the free end portion of said arm, said stylus being arranged to be vibrated by the sound track of a record in a plane generally parallel to the plane of said end portions, a second cantilever arm also having one end rigidly attached to said member, said second arm being spaced from and generally parallel to said first arm, and a vibration-damping block of resilient material supported between the adjacent free end portions of said two arms.

7. A unitary, removable stylus subassembly for use in a magnetic phonograph pickup head having a transverse journal member therein, comprising a supporting shaft adapted to be inserted axially into said member, a cantilever stylus arm, said arm having one end affixed to an end of said shaft so that said arm projects substantially radially from said shaft, said arm comprising a flat strip having two spaced quarter-twists along its length arranged to provide an intermediate flat portion of said strip lying in a plane substantially normal to the plane of its end portions, a cantilever indexing arm, said indexing arm having one end also affixed to said shaft near said end so that said indexing arm is spaced from and generally parallel to said stylus arm, a phonograph stylus, means for mounting said stylus on the free end portion of said stylus arm, and resilient vibration-damping means positioned between the adjacent free end portions of said two arms.

8. A unitary, removable stylus subassembly for use in a magnetic phonograph pickup head having a transverse journal member therein, comprising a supporting shaft adapted to be inserted axially into said member, a cantilever stylus arm, said arm having one end affixed to an end of said shaft so that said arm projects substantially radially from said shaft, said arm comprising a flat strip having two spaced quarter-twists along its length arranged to provide an intermediate flat portion of said strip lying in a plane substantially normal to the plane of its end portions, a cantilever indexing arm, said indexing arm having one end also affixed to said shaft near said end so that said indexing arm is spaced from and generally parallel to said stylus arm, a phonograph stylus, means for mounting said stylus on the free end portion of said stylus arm, a first resilient vibration-damping block positioned between the free end portion of said stylus arm and said indexing arm, and a second, resilient, vibration-damping block positioned between the other end portion of said stylus arm and said indexing arm adjacent said shaft.

9. A quick-replaceable plug-in stylus subassembly for use in a phonograph pickup head having a socket therein, comprising a relatively thin, flat, cantilever stylus arm having a pair of quarter-twists therein, said quarter-twists being spaced along its length so as to provide an intermediate flat portion of said arm lying in a plane substantially normal to the plane of its end portions, a record-engaging stylus, means securing said stylus to one of said end portions, said stylus being arranged to be vibrated by the sound track of a record in a plane generally parallel to the plane of said end portions, a plug-in mounting member adapted to be fitted closely into said socket to form a unitary supporting means therewith, means rigidly securing the other of said end portions to said mounting member, a second cantilever arm also having one end rigidly secured to said mounting member and positioned generally parallel to said first arm, and resilient means interposed between said two arms for damping vibrations of said end portions of said stylus arm in the plane of said intermediate portion, said intermediate portion being free to vibrate as a unit.

10. A stylus carrier assembly for a magnetic pickup head having a pair of magnetic pole pieces, comprising a magnetic ribbon-like member adapted to extend from a point between said pole pieces to a support in a direction generally parallel to the surface of a record to be reproduced, one end of said member being affixed to said support, a stylus affixed to said member near said point and adapted to engage said record, said member having end portions lying generally parallel to the plane of said record and an intermediate portion lying substantially normal to said plane, thereby to provide compliance for desired vibration of said intermediate portion in said plane while said pole pieces and support remain fixed, said support being adapted for attachment in fixed relation to said pickup head, and damping means in engagement with the end of said member to which said stylus is affixed for damping vibration of said member in the plane of said record.

11. A detachable stylus carrier assembly for a magnetic pickup head of the reluctance type having a pair of magnetic pole pieces, comprising a flat cantilever strip of magnetic material adapted to extend from a point between said pole pieces to a supporting member, said strip extending along an axis generally parallel to the surface of a record to be reproduced and having one end rigidly affixed to said member, a stylus affixed to said strip near its free end, said strip further having a pair of spaced quarter-twists therein, the end portions of said strip lying substantially parallel to the plane of said record and the intermediate portion thereof lying substantially normal to said plane, means for detachably securing said supporting member in fixed position on said pickup head, said intermediate portion being free to vibrate as a unit in said plane and damping means in engagement with said strip near its free end for damping vibrations of said strip in said plane.

12. A quick-replaceable plug-in stylus subassembly for use in a magnetic pickup head of the reluctance type having a socket therein, comprising a relatively thin, flat, cantilever stylus arm of magnetic material having a pair of quarter-twists therein, said quarter-twists being spaced along its length so as to provide an intermediate flat portion of said arm lying in a first plane substantially nomal to the plane of its end portions, a record-engaging stylus secured to one of said end portions, said stylus being arranged to be vibrated by the sound track of a record in a second plane generally parallel to the plane of said end portions, a plug-in mounting member adapted to be fitted closely into said socket to form a unitary supporting means therewith, means rigidly securing the other of said end portions to said mounting member, a second cantilever arm also having one end rigidly secured to said mounting member and positioned generally parallel to said first arm, and means comprising a resilient vibration-damping block positioned between the free end portion of said stylus arm and said second arm for damping vibration of said stylus in said first plane, said intermediate portion being free to vibrate as a unit in said second plane.

WILLIAM W. WARD.

References Cited in the file of this patent

UNITED STATES PATENTS

| Number | Name | Date |
|---|---|---|
| 1,160,146 | Dayan | Nov. 16, 1915 |
| 2,326,424 | Andres | Aug. 10, 1943 |
| 2,363,497 | Begun | Nov. 28, 1944 |
| 2,426,061 | Snepvangers | Aug. 19, 1947 |
| 2,455,913 | Bauer | Dec. 14, 1948 |
| 2,485,432 | Cornwell | Oct. 18, 1949 |
| 2,499,196 | Mencke | Feb. 28, 1950 |
| 2,511,663 | Bachman | June 13, 1950 |
| 2,554,208 | Peterson et al. | May 22, 1951 |
| 2,554,209 | Miner et al. | May 22, 1951 |